United States Patent
King (10) Patent No.: US 10,343,134 B2
(45) Date of Patent: Jul. 9, 2019

(54) MICROWAVE IRRADIATION OF A CHAMBER WITH TIME-VARYING MICROWAVE FREQUENCY OR MULTIPLE MICROWAVE FREQUENCIES

(71) Applicant: ECOKAP TECHNOLOGIES LLC, Miami, FL (US)

(72) Inventor: Paul E. King, Albany, OR (US)

(73) Assignee: ECOKAP TECHNOLOGIES LLC, Miami, FL (US)

( * ) Notice: Subject to any disclaimer, the term of this patent is extended or adjusted under 35 U.S.C. 154(b) by 271 days.

(21) Appl. No.: 15/292,100

(22) Filed: Oct. 12, 2016

(65) Prior Publication Data

US 2017/0120215 A1    May 4, 2017

Related U.S. Application Data (60) Provisional application No. 62/249,891, filed on Nov. 2, 2015.

(51) Int. Cl.
*B01J 19/12* (2006.01)
*H05B 6/66* (2006.01)
(Continued)

(52) U.S. Cl.
CPC .......... *B01J 19/126* (2013.01); *H05B 6/664* (2013.01); *H05B 6/702* (2013.01); *H05B 6/705* (2013.01);
(Continued)

(58) Field of Classification Search
CPC .............. B01J 19/126; B01J 2219/1281; B01J 2219/1278; B01J 2219/1296;
(Continued)

(56) References Cited

U.S. PATENT DOCUMENTS

| 4,279,722 A | 7/1981 | Kirkbride |
| 4,435,374 A | 3/1984 | Helm |

(Continued)

FOREIGN PATENT DOCUMENTS

WO    WO 93/14821    8/1993

OTHER PUBLICATIONS

Lee et al, "Semi-analytical solutions for continuous-flow microwave reactors," J. of Engineering Mathematics, vol. 44, pp. 125-145, 2002 (Year: 2002).*

(Continued)

*Primary Examiner* — Nicholas A Smith
*Assistant Examiner* — Colleen M Raphael
(74) *Attorney, Agent, or Firm* — David S. Alavi (57) ABSTRACT

A reaction chamber contains catalytic material(s). Tunable microwave source(s) each emit microwave radiation at corresponding time-varying microwave frequency(ies) or at simultaneous multiple different microwave frequencies. Microwave transmission element(s) irradiate the interior volume of the reaction chamber with the microwave radiation, emitted by the microwave source(s), that propagates along the transmission element(s) into the reaction chamber. The reaction chamber is characterized by a maximum temperature variation of a fixed-frequency, steady-state temperature spatial profile that results from irradiation of the reaction chamber by microwave radiation at a substantially fixed microwave frequency and at a reference microwave power level. Irradiation of the reaction chamber at the reference microwave power level by the microwave radiation with the time-varying microwave frequency(ies), or the simultaneous multiple different microwave frequencies, results in a multi-frequency temperature spatial profile having a maximum temperature variation less than the maxi- (Continued)

mum temperature variation of the fixed-frequency, steady-state temperature spatial profile.

26 Claims, 5 Drawing Sheets (51) Int. Cl.
*H05B 6/70* (2006.01)
*H05B 6/80* (2006.01)

(52) U.S. Cl.
CPC ............. *H05B 6/707* (2013.01); *H05B 6/806* (2013.01); *B01J 2219/1215* (2013.01); *B01J 2219/1278* (2013.01); *B01J 2219/1281* (2013.01); *B01J 2219/1296* (2013.01); *H05B 2206/044* (2013.01)

(58) Field of Classification Search
CPC .. B01J 2219/1215; H05B 6/707; H05B 6/705; H05B 6/806; H05B 6/702; H05B 6/664; H05B 2206/044
USPC .................. 204/157.43, 157.6; 422/186–187
See application file for complete search history.

(56) References Cited

U.S. PATENT DOCUMENTS

| | | | | |
|---|---|---|---|---|
| 6,046,373 | A * | 4/2000 | Sun | B01J 29/06 204/157.15 |
| 6,261,525 | B1 | 7/2001 | Minaee | |
| 6,284,202 | B1 * | 9/2001 | Cha | B01D 53/8631 422/186 |
| 6,451,174 | B1 * | 9/2002 | Burkitbaev | B01J 19/126 204/157.15 |
| 6,864,757 | B2 | 3/2005 | Du Toit et al. | |
| 8,128,788 | B2 * | 3/2012 | Proudkii | B01J 19/126 204/157.15 |
| 8,779,013 | B2 | 7/2014 | Livneh | |
| 9,288,214 | B2 | 1/2016 | Livneh | |
| 9,353,323 | B2 | 5/2016 | Kyle | |
| 2007/0075072 | A1 * | 4/2007 | Roussy | H05B 6/704 219/695 |
| 2007/0102279 | A1 | 5/2007 | Novak | |
| 2007/0131591 | A1 * | 6/2007 | Pringle | B01J 19/126 422/186 |
| 2008/0233020 | A1 | 9/2008 | Purta et al. | |
| 2008/0314730 | A1 * | 12/2008 | Pringle | C10G 1/00 204/157.6 |
| 2012/0125920 | A1 | 5/2012 | Novak | |
| 2013/0096213 | A1 | 4/2013 | Livrieh | |
| 2014/0121395 | A1 | 5/2014 | Ishizuka et al. | |
| 2014/0163120 | A1 | 6/2014 | Kyle | |
| 2014/0346030 | A1 | 11/2014 | Livneh | |
| 2014/0356246 | A1 | 12/2014 | Livneh | |
| 2015/0305097 | A1 | 10/2015 | Ashida et al. | |
| 2016/0082409 | A1 | 3/2016 | Ishizuka et al. | |
| 2016/0222300 | A1 | 8/2016 | Livneh | |
| 2016/0333281 | A1 | 11/2016 | Kyle | |

OTHER PUBLICATIONS

Sturm et al, "On the effect of resonant microwave fields on temperature distribution in time and space," Int'l J. of Heat and Mass Transfer, vol. 55 (2012) pp. 3800-3811 (Year: 2012).*

International Search Report dated Jan. 11, 2017 in counterpart App No. PCT/US2016/056694.

Pending U.S. Appl. No. 15/228,862, filed Aug. 4, 2016 in the names of King et al.

Pending U.S. Appl. No. 15/228,904, filed Aug. 4, 2016 in the names of King et al.

Pending U.S. Appl. No. 15/403,127, filed Jan. 10, 2017 in the name of King.

Search Report dated Apr. 5, 2019 in counterpart EP App No. 16862678.6.

* cited by examiner

FIG. 4

MICROWAVE IRRADIATION OF A CHAMBER WITH TIME-VARYING MICROWAVE FREQUENCY OR MULTIPLE MICROWAVE FREQUENCIES

BENEFIT CLAIMS TO RELATED APPLICATIONS

This application claims benefit of U.S. provisional Application No. 62/249,891 entitled "Microwave irradiation of a chamber with time-varying microwave frequency" filed Nov. 2, 2015 in the name of Paul E. King, said provisional application being hereby incorporated by reference as if fully set forth herein.

FIELD OF THE INVENTION

The field of the present invention relates to heating using microwave irradiation. In particular, apparatus and methods are described herein for microwave irradiation of a chamber with time-varying microwave frequency or with multiple simultaneous microwave frequencies.

BACKGROUND

Many examples exist wherein a reaction chamber containing catalytic material(s) is irradiated with microwave energy to increase the rate of one or more catalyzed chemical reactions in the chamber. A few of those examples are described in:
- U.S. Pat. No. 4,435,374 entitled "Method of producing carbon monoxide and hydrogen by gasification of solid carbonaceous material involving microwave irradiation" issued Mar. 6, 1984 to Helm;
- U.S. Pub. No. 2014/0163120 entitled "Method and apparatus for producing liquid hydrocarbon fuels" published Jun. 12, 2014 in the name of Kyle;
- U.S. Pub. No. 2014/0346030 entitled "Methods and apparatus for liquefaction of organic solids" published Nov. 27, 2014 in the name of Livneh;
- U.S. Pub. No. 2014/0356246 entitled "Process and apparatus for converting greenhouse gases into synthetic fuels" published Dec. 4, 2014 in the name of Livneh; and
- U.S. Pat. No. 8,779,013 entitled "Process and apparatus for converting greenhouse gases into synthetic fuels" issued Jul. 15, 2014 to Livneh.

SUMMARY

A reaction chamber contains one or more catalytic materials. One or more tunable microwave sources each emit microwave radiation at a corresponding time-varying microwave frequency. One or more microwave transmission elements irradiate the interior volume of the reaction chamber with the microwave radiation, emitted by the one or more microwave sources, that propagates along the one or more microwave transmission elements into the reaction chamber. The reaction chamber is characterized by a maximum temperature variation of a fixed-frequency, steady-state temperature spatial profile that results from irradiation of the reaction chamber by microwave radiation at a substantially fixed microwave frequency and at a reference microwave power level. Upon irradiation of the reaction chamber by the microwave radiation with the time-varying microwave frequency(ies) and at the reference microwave power level, the multiple different simultaneous microwave frequencies or the time variation of the microwave frequency results in a multi-frequency temperature spatial profile having a maximum temperature variation less than the maximum temperature variation of the fixed-frequency, steady-state temperature spatial profile.

A method employing the apparatus comprises: (a) emitting from the one or more microwave sources the microwave radiation at the multiple different microwave frequencies simultaneously or at the one or more time-varying microwave frequencies; and (b) irradiating the reaction chamber with the microwave radiation that is emitted by the microwave source(s) and propagates along the microwave transmission element(s) into the reaction chamber. The method can further include introducing one or more reactant materials into the reaction chamber and extracting one or more product materials from the reaction chamber. The reactant material(s) react and form the product material(s) in the reaction chamber according to a microwave-assisted chemical reaction catalyzed by the catalytic material(s) upon irradiation by the microwave radiation.

Objects and advantages pertaining to microwave irradiation of a chamber with time-varying microwave frequency may become apparent upon referring to the example embodiments illustrated in the drawings or disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A depicts temperature contours as a function of two-dimensional position in and around the reaction vessel; FIG. 1B depicts temperature as a function of distance along the reaction vessel. In this example the reaction chamber comprises microwave-transmitting material and is positioned within an outer vessel (typically metal) coupled to the microwave transmission elements; any suitable arrangement of the reaction chamber and microwave transmission elements can be employed.

FIG. 2A depicts temperature contours as a function of two-dimensional position in and around the reaction vessel; FIG. 2B depicts temperature as a function of distance along the reaction vessel.

FIG. 3A depicts temperature contours as a function of two-dimensional position in and around the reaction vessel; FIG. 3B depicts temperature as a function of distance along the reaction vessel.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

Figure 1A:
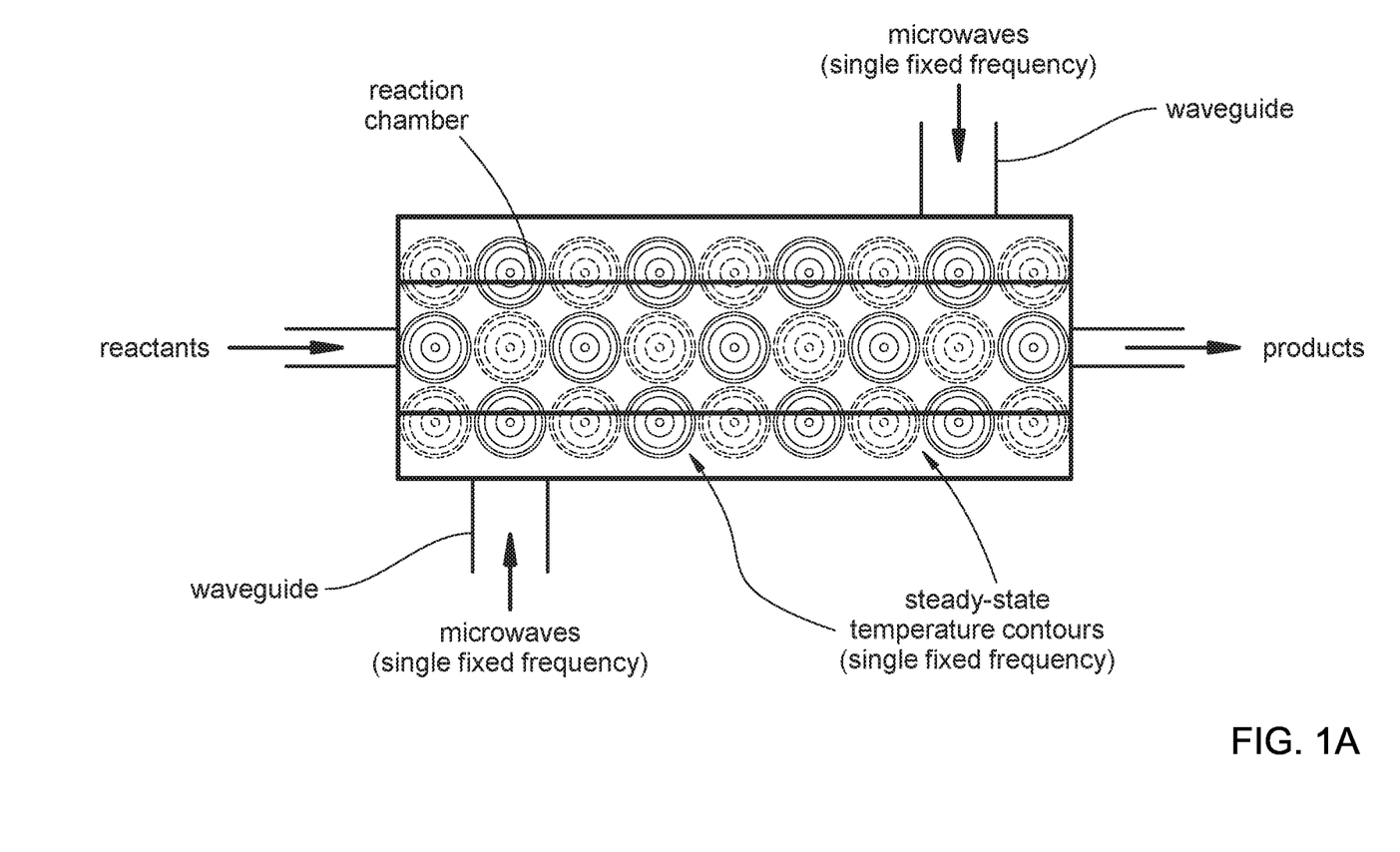
FIGS. 1A and 1B are schematic illustrations of an example steady-state temperature spatial profile resulting from conventional irradiation of a reaction chamber at a single fixed microwave frequency.
Figure 1B:
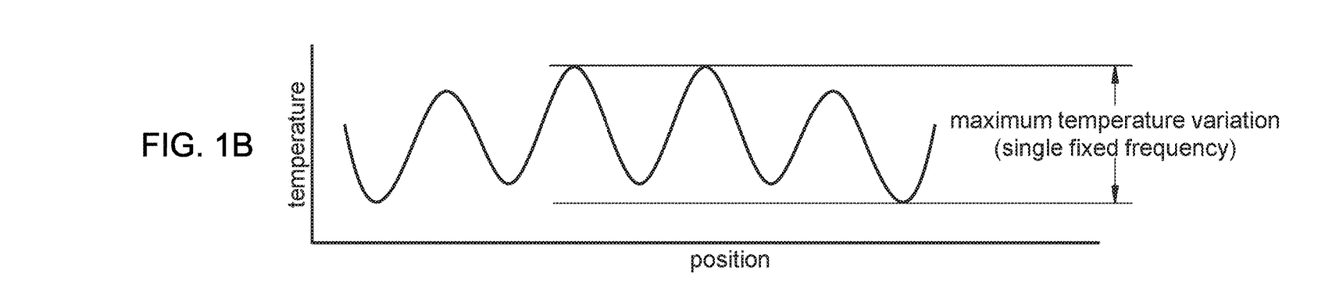

A problem that often arises in the microwave-irradiated reaction chambers in the examples cited earlier is uneven heating of the catalytic material(s). Uneven heating leads to a steady-state spatial profile of the temperature within the reaction vessel that exhibits potentially large temperature variations (e.g., greater than 1000° C. peak-to-peak; in extreme instances the uneven heating can lead to localized arcing or plasma formation, with concomitant peak-to-peak temperature variations of 2000° C., 3000° C., or even higher, often accompanied by damage to the chamber or catalytic material). An example is illustrated schematically in FIG. 1A (steady-state temperature contours as a function of position within and around the reaction chamber) and FIG. 1B (steady-state temperature as a function of distance along the reaction chamber). It would be desirable to irradiate the reaction chamber in a way that results in a steady-state temperature spatial profile having reduced variation (e.g., less than about 1000° C. peak-to-peak or even lower).

Uneven heating by microwave irradiation of the interior of a chamber typically arises from a standing-wave-like microwave intensity pattern that occurs within the chamber when irradiated at a single, fixed microwave frequency. There may not be full-blown antinodes where the microwave intensity drops to zero, but interference among multiple microwave transmission elements and reflections within or around the reaction chamber certainly result in wide variations between microwave intensity maxima and minima, leading to uneven heating. The problem of uneven heating is well known in household microwave ovens. One way to mitigate that problem is to place the food to be heated on a rotating turntable in the oven, so that different regions of the food pass through microwave intensity maxima or minima at different times, which can at least partly even out the heating of the food.

The contents of a reaction vessel, e.g., a packed bed of catalytic material(s) or catalytic monoliths, typically cannot be so readily rotated within the irradiated reaction chamber. In some inventive examples disclosed herein, microwave radiation at one or more time-varying microwave frequencies is used to irradiate the contents of the reaction vessel, so that the standing-wave-like microwave intensity maxima and minima move about within and around the reaction chamber as the microwave frequency varies. If the one or more microwave frequencies are varied fast enough over a large enough microwave tuning range, a temperature spatial profile can result that exhibits reduced temperature variation relative to a fixed-frequency, steady-state temperature spatial profile such as that described above and illustrated in FIGS. 1A and 1B. An example of such a multi-frequency temperature spatial profile is illustrated schematically in FIG. 2A (temperature contours as a function of position within and around the reaction chamber) and FIG. 2B (temperature as a function of distance along the reaction chamber). In some inventive examples disclosed herein, microwave radiation at simultaneous multiple different frequencies (time-varying or substantially constant) is used to irradiate the contents of the reaction vessel, so that multiple corresponding different standing-wave-like microwave intensity patterns overlap within and around the reaction vessel. The microwave intensity maxima and minima of each pattern typically do not align with those of the others, so that an overall temperature spatial profile can result that exhibits reduced temperature variation relative to a fixed-frequency, steady-state temperature spatial profile such as that described above and illustrated in FIGS. 1A and 1B. An example of such a multi-frequency temperature spatial profile is illustrated schematically in FIG. 3A (temperature contours as a function of position within and around the reaction chamber) and FIG. 3B (temperature as a function of distance along the reaction chamber). Note that FIGS. 1A, 1B, 2A, 2B, 3A, and 3B are not actual or calculated microwave intensity distributions, but are merely intended to illustrate the general behavior of the disclosed apparatus and methods; an observed or calculated temperature spatial profile will not necessarily exhibit any of the periodicity or symmetry exhibited in FIG. 1A, 1B, 2A, 2B, 3A, or 3B.

Previously, microwave enhancement of catalyzed chemical reactions has been performed using a fixed-frequency microwave source (often operating at a fixed frequency between, e.g., about 700 MHz and about 3000 MHz; 915 MHz is a microwave frequency that is commonly employed). Such a fixed-frequency source typically employs a magnetron as a microwave transmitter and can be readily adapted to produce the power necessary to irradiate the reaction chamber (e.g., tens or hundreds of kW), but typically is not amenable to rapid changes of microwave frequency. Two or more of such fixed-frequency sources can be employed, e.g., in inventive apparatus and methods disclosed herein wherein simultaneous multiple different microwave frequencies are employed. New digital, solid-state microwave transmitters have become available that can accommodate relatively rapidly tuning across a tuning range between, e.g., about 300 MHz and about 300 GHz, while producing the necessary power levels. One or more of such sources can be employed, e.g., in inventive apparatus and methods disclosed herein wherein one or more time-varying microwave frequencies are employed. In any given apparatus a smaller range typically will be employed, e.g., 900 to 1000 MHz, 2000 to 3000 MHz, or 5500 GHz to 7500 GHz; any suitable, desirable, or convenient tuning range can be employed; a specific range might be indicated in certain circumstances, e.g., for particular catalytic material(s) or particular reactant(s) or product(s).

Examples of microwave transmission elements can include one or more microwave waveguides, one or more coaxial cables connected to microwave-emitting antennae, other suitable microwave transmission elements, or combinations thereof. Example apparatus that include waveguides are shown and described in the present disclosure, but it should be understood that any other one or more suitable microwave transmission elements can be employed while remaining within the scope of the present disclosure or appended claims.

The reaction chamber contains one or more catalytic materials. One or more microwave sources collectively emit microwave radiation at multiple different microwave frequencies simultaneously or at one or more corresponding time-varying microwave frequencies; in examples wherein the microwave radiation includes simultaneous multiple different microwave frequencies, those frequencies can be time-varying or substantially constant. In some examples, each microwave source emits only a single frequency (time-varying or substantially constant); in other examples, at least one source can emit multiple frequencies (time-varying or substantially constant). A "single tunable microwave source" can comprise a single microwave oscillator (tunable or fixed-frequency) coupled to a single microwave amplifier, or a single oscillator coupled to multiple amplifiers. One or more microwave transmission elements irradiate at least portions of an interior volume of the reaction chamber with the microwave radiation, emitted by the one or more microwave sources, that propagates along the one or more microwave transmission elements (e.g., through one or more microwave waveguides) into the reaction chamber. The reaction chamber is characterized by a maximum temperature variation of a fixed-frequency, steady-state temperature spatial profile (e.g., as in FIGS. 1A and 1B) that would result from irradiation, via the one or more microwave transmission elements, of the interior volume by microwave radiation at a substantially fixed microwave frequency and at a reference microwave power level.

Figure 2A:
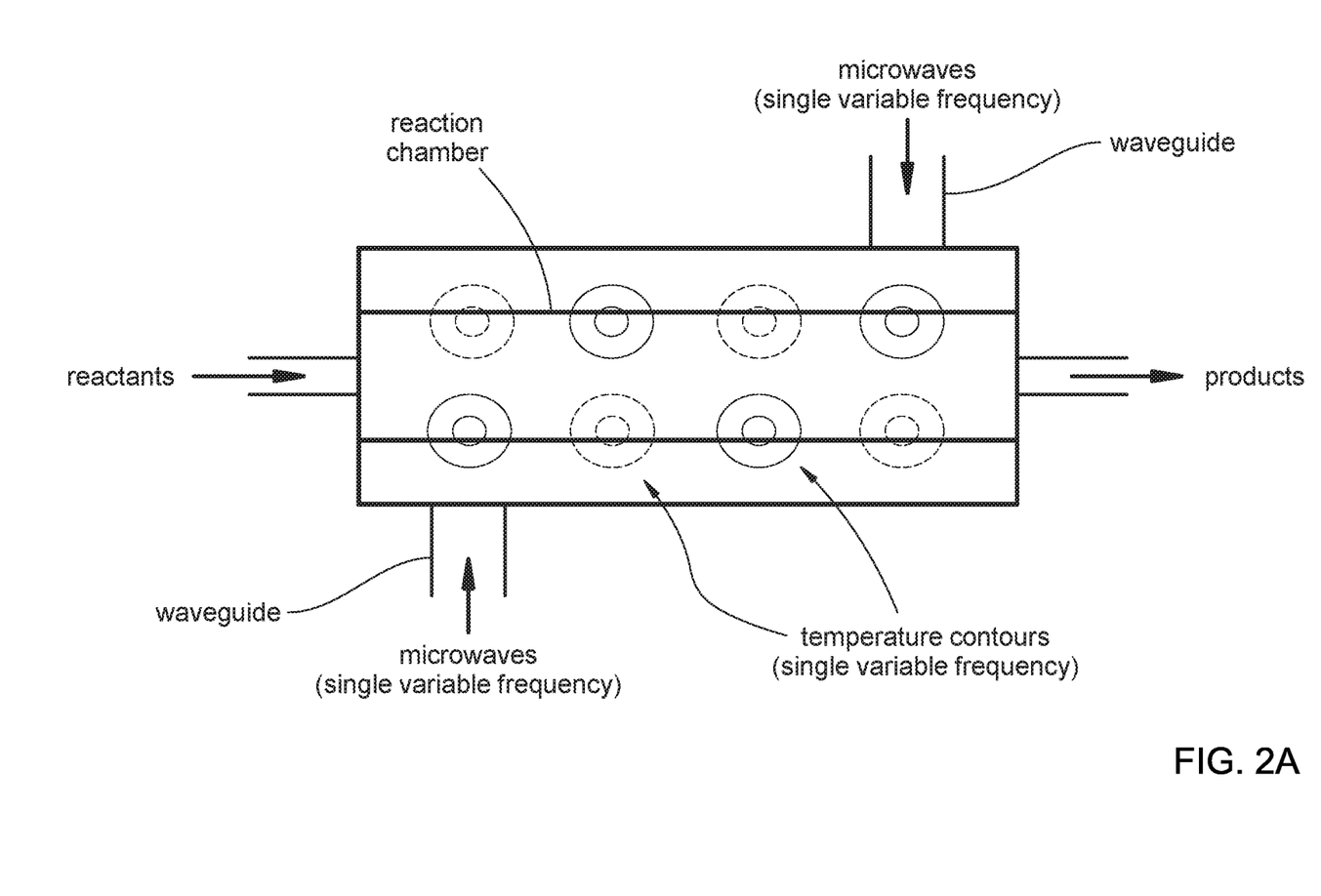
FIGS. 2A and 2B are schematic illustrations of an example temperature spatial profile resulting from inventive irradiation of the reaction chamber at a single time-varying microwave frequency.
Figure 2B:
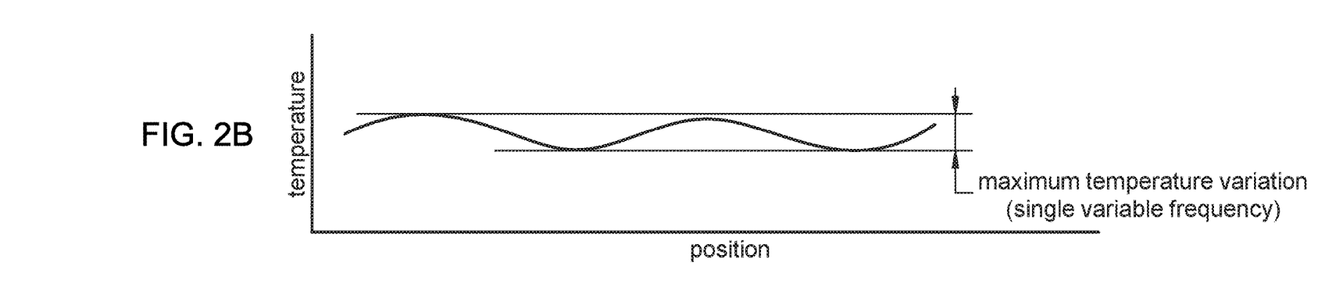
Figure 3A:
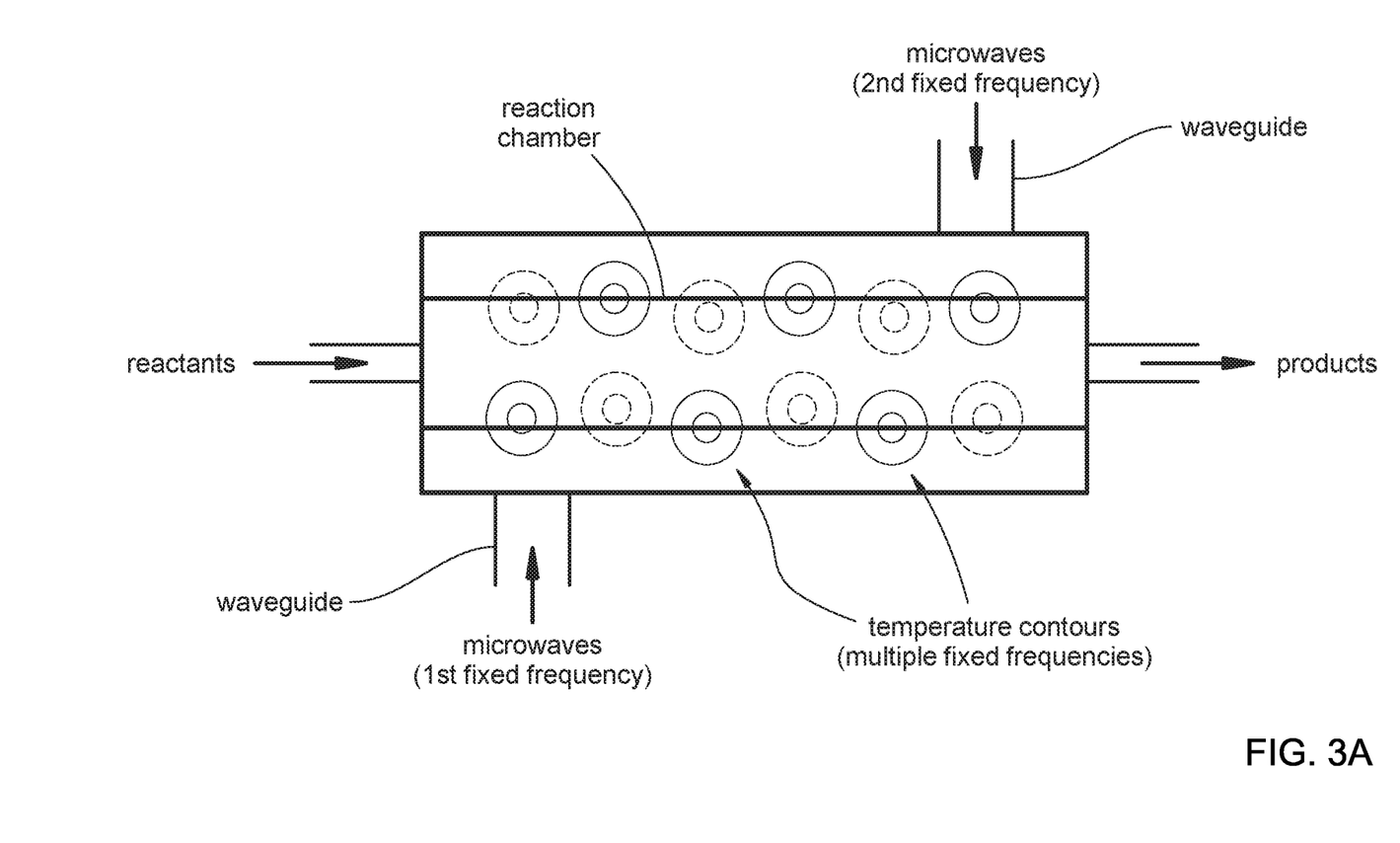
FIGS. 3A and 3B are schematic illustrations of an example temperature spatial profile resulting from inventive irradiation of the reaction chamber at multiple fixed microwave frequencies simultaneously.
Figure 3B:
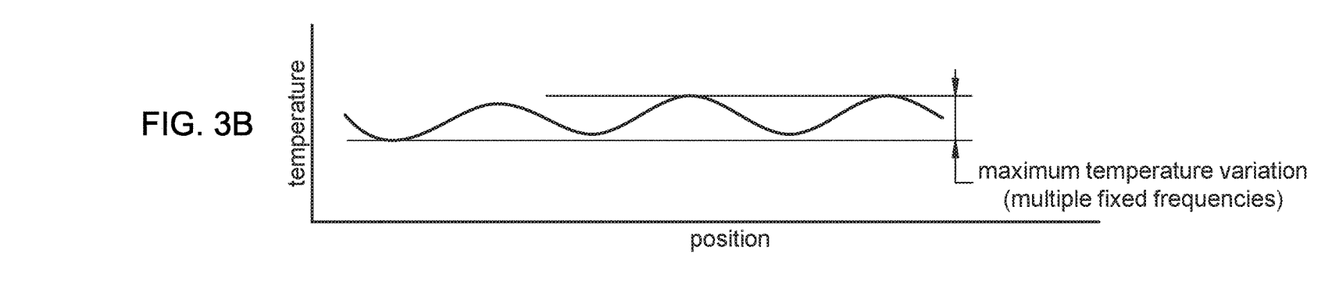

Upon irradiation of the interior volume at the same reference microwave power level, by the microwave radiation that propagates along the one or more microwave transmission elements, at the multiple different microwave frequencies simultaneously or at the one or more time-varying microwave frequencies, the multiple simultaneous frequencies or the time variation of each time-varying microwave frequency results in a multi-frequency temperature spatial profile (e.g., as in FIGS. 2A and 2B for a single time-varying frequency, or as in FIGS. 3A and 3B for simultaneous multiple different fixed frequencies). "Multi-frequency" indicates that the temperature spatial profile arises from multiple microwave frequencies, whether those multiple frequencies are present in the reaction chamber simultaneously (e.g., as in FIGS. 3A/3B) or sequentially (e.g., as in FIGS. 2A/2B) or both. The multi-frequency profile has a maximum temperature variation that is less than the maximum temperature variation of the fixed-frequency, steady-state temperature spatial profile (e.g., as in FIGS. 1A/1B).

A method comprises (a) emitting from the one or more microwave sources the microwave radiation at the multiple different microwave frequencies simultaneously or at the one or more time-varying microwave frequencies; and (b) irradiating at least portions of the interior volume of the reaction chamber with the microwave radiation of part (a) that propagates along the one or more microwave transmission elements into the reaction chamber. The method can further include introducing one or more reactant materials into the reaction chamber and extracting one or more product materials from the reaction chamber. The reactant material(s) react and form the product material(s) in the reaction chamber according to a microwave-assisted chemical reaction catalyzed by the catalytic material(s) upon irradiation by the microwave radiation.

Any suitable variation of the time-varying microwave frequency(ies) with time can be employed; similarly, any suitable number of and different values for the simultaneous multiple different frequencies can be employed. Suitability is indicated by time variation being large enough and fast enough, or multiple frequencies sufficiently different or numerous, to result in the desired multi-frequency temperature spatial profile, i.e., a spatial profile having a sufficiently small maximum temperature variation (defined herein as maximum peak-to-peak temperature variation within the reaction chamber; other definitions or criteria can be equivalently employed). "Sufficiently small temperature variation" can be defined according to a variety of criteria. In some examples, it may be sufficient to reduce the temperature variation within the reaction chamber only enough to avoid arcing, generating plasma, or damaging the chamber or catalytic material; in other examples, reducing the temperature variation below a specific target value might be needed or desired; in other examples, the temperature variation can be reduced until some target parameter is reached, such as overall reaction rate or percent yield; in still other examples, optimization to achieve a minimum temperature variation might be needed or desired; all such examples shall fall within the scope of the present disclosure or one or more of the appended claims.

Figure 4:
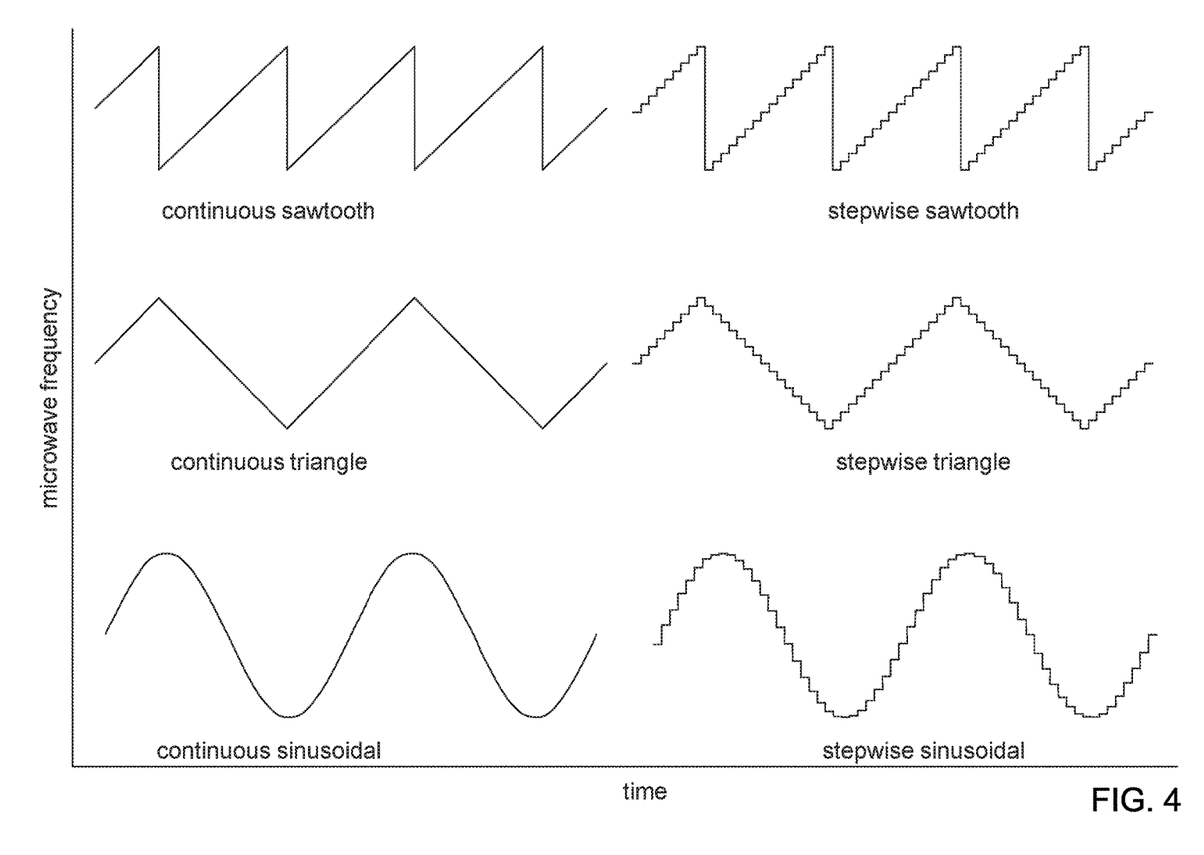
FIG. 4 illustrates schematically examples of periodic variation of a time-varying microwave frequency.

In some examples, each time-varying microwave frequency varies irregularly across the corresponding microwave tuning range. In other examples, each time-varying microwave frequency undergoes a periodic variation across a corresponding microwave tuning range; the periodic variation is characterized by a corresponding frequency-variation period. Any suitable frequency-variation period(s) can be employed (discussed further below), e.g., between about 10 milliseconds and about 10 seconds. A suitable microwave tuning range for the periodic frequency variation can extend, e.g., from about 900 MHz to about 1000 MHz, from about 2000 MHz to about 2500 MHz, or from about 5500 MHz to about 7500 MHz; any suitable, desirable, or convenient periodic tuning range can be employed, as noted above. Any suitable periodic form of the frequency variation can be employed, including but not limited to a periodic variation that substantially conforms to a stepwise or continuous sawtooth waveform, a stepwise or continuous triangular waveform, or a stepwise or continuous sinusoidal waveform (examples shown in FIG. 4); in some examples only a single "step" can be employed, and each of the stepwise waveforms reverts to a square waveform alternating between two microwave frequencies. In one specific example of a suitable periodic variation of the microwave frequency, the microwave frequency can vary from 900 MHz to 990 MHz in 10 MHz increments and then drop back down to 900 MHz each period, with a dwell time of about 100 milliseconds at each step; the resulting frequency-variation period is about 1 second.

The reaction chamber can be characterized by a time constant for reaching the fixed-frequency, steady-state temperature spatial profile in the interior volume upon irradiation, along the one or more microwave transmission elements, of the interior volume by microwave radiation at a substantially fixed microwave frequency. In some examples, the frequency-variation period can be shorter than, or at least no longer than, such a reaction chamber time constant. In those instances, the slower response time of the reaction chamber substantially completely "smears out" the differing temperature spatial profiles in the reaction chamber that would have arisen from differing frequencies within the microwave tuning range, so that a steady-state temperature spatial profile is obtained despite the time-varying microwave frequency(ies). The steady-state temperature spatial profile arising from the time-varying microwave frequency (ies) (e.g., as exemplified in FIGS. 2A and 2B) exhibits maximum temperature variation that is less than that of the fixed-frequency, steady-state temperature spatial profile (e.g., as exemplified in FIGS. 1A and 1B). To achieve a steady-state temperature spatial profile with time-varying microwave frequency(ies), each corresponding frequency-variation period can be less than about one fifth of the time constant, less than about one third of the time constant, less than about half the time constant, or less than or about equal to the time constant.

In other examples, the frequency-variation period can be longer than the time constant of the reaction chamber. In those instances, the temperature spatial profile within the reaction chamber (still resembling that example of FIGS. 2A and 2B) does not achieve a steady state, but instead varies with time in response to the time variation of the microwave frequency(ies). However, sufficiently fast variation of the microwave frequency(ies) (i.e., sufficiently small frequency-variation period(s), even if longer than the reaction chamber time constant) can still result in the time-varying temperature spatial profile being at least partly "smeared out" so as to result in a maximum temperature variation within the reaction chamber (perhaps varying with time) that is "sufficiently small" (as discussed above), and still less than the maximum temperature variation of the fixed-frequency, steady-state temperature spatial profile.

In some examples, microwave radiation at two or more time-varying microwave frequencies irradiates the inner volume of the reaction chamber, and at least one of the time-varying microwave frequencies exhibits a frequency-variation period that differs from that of at least one other of the time-varying microwave frequencies. In some examples, microwave radiation at two or more time-varying microwave frequencies irradiates the inner volume of the reaction chamber, each one of the time-varying microwave frequencies exhibits the same frequency-variation period as the other time-varying microwave frequencies, and the periodic variation of at least one of the time-varying microwave frequencies is temporally offset from that of at least one other of the time-varying microwave frequencies; in some of those examples the temporal offset can vary with time. In some examples, at least one corresponding microwave tuning range differs from at least one other corresponding microwave tuning range; in other examples, the one or more time-varying microwave frequencies all vary across a single microwave tuning range. In some examples, the microwave radiation that irradiates the inner volume of the reaction chamber includes only one time-varying microwave frequency characterized by only a single frequency-variation period and a single microwave tuning range. In some examples wherein the microwave radiation that irradiates the inner volume of the reaction chamber simultaneous multiple different microwave frequencies, those simultaneous multiple different microwave frequencies that are substantially constant with respect to time, and the microwave radiation does not include any time-varying microwave frequency. In addition, pulsing the microwave radiation, at any suitable pulse frequency and with any suitable duty cycle, can be combined with any of the microwave frequency schemes (time-varying or not) that are disclosed herein. If multiple microwave frequencies are employed, they can all be pulsed together, or each can be pulsed independently of the others.

In some examples only a single waveguide, antenna, or other transmission element irradiates the interior volume of the reaction chamber; in other examples multiple waveguides, antennae, or transmission elements irradiate the interior volume of the reaction chamber. In some multiple-transmission-element examples, the reaction chamber is elongated along an axis, and corresponding entry points of at least a subset of the multiple transmission elements into the reaction chamber are arranged circumferentially about the axis. In some multiple-transmission-element examples, the reaction chamber is elongated along an axis, and entry points of at least a subset of the multiple transmission elements are arranged lengthwise along the reaction chamber. In some multiple-transmission-element examples, the reaction chamber is elongated along an axis, and entry points of at least a subset of the multiple transmission elements are arranged in a spiral along the reaction chamber. In some multiple-transmission-element examples, the reaction chamber is elongated along an axis, and entry points of at least a subset of the multiple transmission elements are arranged so that the microwave radiation propagates longitudinally through the reaction chamber. Other suitable or desirable arrangements of the one or more waveguides, antennae, or other microwave transmission elements can be employed.

In some examples, the one or more tunable microwave sources and the multiple microwave transmission elements are arranged so that the microwave radiation that propagates along each one of the multiple transmission elements includes the same one or more microwave frequencies as that propagating along the other transmission elements; that can be readily achieved, e.g., by using a single microwave source and splitting its output among the multiple transmission elements. The corresponding relative phase of the microwave radiation propagating along at least one transmission element can differ from that of at least one other of the transmission elements. The relative phase(s) can remain substantially constant, or the relative phase(s) can vary with time. The relative phase(s) can be selected to achieve a desired temperature spatial profile or time-dependence thereof. The relative phases of the microwaves propagating along the multiple microwave transmission elements can be optimized according to any desired criteria for the microwave intensity distribution or the temperature profile (as discussed above).

In some examples, the one or more microwave sources and the multiple microwave transmission elements are arranged so that the microwave radiation that propagates along at least one of the multiple transmission elements includes at least one microwave frequency different from that propagating along at least one of the other transmission elements. In some examples, the one or more microwave sources and the one or more transmission elements are arranged so that at least one of the transmission elements irradiates the interior volume of the reaction chamber with microwave radiation at two or more of the simultaneous multiple different microwave frequencies. Any suitable or desirable distribution of two or more microwave frequencies among multiple microwave transmission elements can be employed, and can be optimized according to any desired criteria for the microwave intensity distribution or the temperature profile (as discussed above).

In some examples, the one or more microwave sources are arranged so that the microwave radiation that propagates along each one of the multiple microwave transmission elements has the same microwave power level as that propagating along the other microwave transmission elements. In some other examples, the power level of the microwave radiation propagating along at least one transmission element can differ from that of at least one other of the transmission elements. The relative power levels of the microwaves propagating along the multiple microwave transmission elements can be optimized according to any desired criteria of the microwave intensity distribution or the temperature profile (as discussed above).

In some examples, the method can further comprise introducing one or more reactant materials into the reaction chamber. The one or more reactant materials react in the reaction chamber according to a microwave-assisted chemical reaction catalyzed by the one or more catalytic materials upon irradiation by the microwave radiation. In some of those examples, the one or more reactant materials can flow through one or more reactant inlets into the reaction chamber.

In some examples, the method can further comprise extracting one or more product materials from the reaction chamber. The one or more product materials are produced in the reaction chamber by the microwave-assisted chemical reaction catalyzed by the one or more catalytic materials upon irradiation by the microwave radiation. In some of those examples, the one or more product materials can flow through one or more product outlets out of the reaction chamber.

Any microwave-assisted catalyzed chemical reaction can be incorporated into the disclosed methods and apparatus. In some examples, the reactant(s) can include one or more of carbon dioxide, carbon monoxide, one or more alkanes (e.g., methane, ethane, or other alkanes), one or more alkenes, one or more alkynes, one or more alcohols (e.g., methanol, ethanol, or other alcohols), coal, coke, biomass or biochar, water or steam, hydrogen, oxygen, nitrogen, one or more nitrogen oxides, or one or more sulfur oxides. In some examples, product(s) can include one or more of carbon dioxide, carbon monoxide, water or steam, hydrogen, synthesis gas, nitrogen, ammonia, sulfur, one or more alkanes, one or more alkenes, one or more alkynes, or one or more alcohols. In some examples, catalytic material(s) can include one or more of magnetite, iron, nickel, copper, cobalt, aluminum, zeolite, rhodium, palladium, platinum, other metal(s), other metal oxide(s), other metal compound(s), or various combinations thereof. In some examples, the catalytic material(s) can be arranged in the reaction chamber as a packed bed, as a fluidized bed (e.g., bubbling, slurry or other arrangement), as one or more monoliths, or in other suitable arrangements.

In addition to the preceding, the following examples fall within the scope of the present disclosure or appended claims:

Example 1

An apparatus comprising: (a) a reaction chamber containing one or more catalytic materials; (b) one or more microwave sources arranged collectively so as to emit microwave radiation at multiple different microwave frequencies simultaneously or at one or more time-varying microwave frequencies; and (c) one or more microwave transmission elements arranged so as to irradiate at least portions of an interior volume of the reaction chamber with the microwave radiation of part (b) that propagates along the one or more microwave transmission elements into the reaction chamber, wherein: (d) the reaction chamber is characterized by a maximum temperature variation of a fixed-frequency, steady-state temperature spatial profile that results from irradiation, along the one or more microwave transmission elements, of the interior volume by microwave radiation at a single substantially fixed microwave frequency and at a reference microwave power level; and (e) upon irradiation of the interior volume at the reference power level, by the microwave radiation of part (b) that propagates along the one or more microwave transmission elements of part (c), the multiple different simultaneous microwave frequencies or the one or more time-varying microwave frequencies result in a multi-frequency temperature spatial profile having a maximum temperature variation less than the maximum temperature variation of the fixed-frequency, steady-state temperature spatial profile.

Example 2

The apparatus of Example 1 wherein the one or more microwave transmission elements includes one or more microwave waveguides.

Example 3

The apparatus of any one of Examples 1 or 2 wherein the one or more microwave transmission elements includes one or more coaxial cables connected to one or more corresponding microwave antennae.

Example 4

The apparatus of any one of Examples 1 through 3 wherein (i) the microwave radiation of part (b) includes the one or more time-varying microwave frequencies, (ii) each time-varying microwave frequency undergoes a periodic variation across a corresponding microwave tuning range, and (iii) the periodic variation is characterized by a corresponding frequency-variation period.

Example 5

The apparatus of Example 4 wherein each corresponding frequency-variation period is between about 10 milliseconds and about 10 seconds.

Example 6

The apparatus of any one of Examples 4 or 5 wherein the periodic variation substantially conforms to a stepwise or continuous sawtooth waveform, a stepwise or continuous triangular waveform, a stepwise or continuous sinusoidal waveform, or a substantially square waveform.

Example 7

The apparatus of any one of Examples 4 through 6 wherein each corresponding frequency-variation period is sufficiently short so that the multi-frequency temperature spatial profile achieves a substantially steady state during irradiation of the interior volume by the microwave radiation of part (b) that propagates along the one or more microwave transmission elements of part (c).

Example 8

The apparatus of any one of Examples 4 through 7 wherein the reaction chamber is characterized by a time constant for reaching the fixed-frequency, steady-state temperature spatial profile in the interior volume upon irradiation, along the one or more microwave transmission elements, of the interior volume by microwave radiation at a substantially fixed microwave frequency, and each corresponding frequency-variation period is less than about one fifth of the time constant, less than about one third of the time constant, less than about half the time constant, or less than or about equal to the time constant.

Example 9

The apparatus of any one of Examples 4 through 6 wherein at least one corresponding frequency-variation period is sufficiently long so that the multi-frequency temperature spatial profile varies with time during irradiation of the interior volume by the microwave radiation of part (b) that propagates along the one or more microwave transmission elements of part (c).

Example 10

The apparatus of any one of Examples 4 through 9 wherein (i) the microwave radiation of part (b) includes two or more time-varying microwave frequencies, and (ii) the corresponding frequency-variation period of at least one time-varying microwave frequency differs from the corresponding frequency-variation period of at least one other of the time-varying microwave frequencies.

Example 11

The apparatus of any one of Examples 4 through 9 wherein (i) the microwave radiation of part (b) includes two or more time-varying microwave frequencies, (ii) the time-varying microwave frequencies are all characterized by only a single frequency-variation period, and (iii) the corresponding periodic variation of at least one of the time-varying microwave frequencies is temporally offset from the corresponding periodic variation of at least one other of the time-varying microwave frequencies.

Example 12

The apparatus of Example 11 wherein a temporal offset between at least one pair of the time-varying microwave frequencies varies with time.

Example 13

The apparatus of any one of Examples 1 through 3 wherein (i) the microwave radiation of part (b) includes the one or more time-varying microwave frequencies, and (ii) each time-varying microwave frequency varies irregularly across a corresponding microwave tuning range.

Example 14

The apparatus of any one of Examples 4 through 13 wherein each corresponding microwave tuning range extends from about 900 MHz to about 1000 MHz, from about 2000 MHz to about 2500 MHz, or from about 5500 MHz to about 7500 MHz.

Example 15

The apparatus of any one of Examples 4 through 14 wherein at least one corresponding microwave tuning range differs from at least one other corresponding microwave tuning range.

Example 16

The apparatus of any one of Examples 4 through 14 wherein the one or more time-varying microwave frequencies all vary across a single microwave tuning range.

Example 17

The apparatus of any one of Examples 4 through 14 wherein the microwave radiation of part (b) includes only one time-varying microwave frequency characterized by only a single frequency-variation period and a single microwave tuning range.

Example 18

The apparatus of any one of Examples 1 through 17 wherein the microwave radiation of part (b) includes the simultaneous multiple different microwave frequencies.

Example 19

The apparatus of any one of Examples 1 through 3 wherein the microwave radiation of part (b) includes the simultaneous multiple different microwave frequencies that are substantially constant with respect to time, and does not include any time-varying microwave frequency.

Example 20

The apparatus of any one of Examples 1 through 19 wherein only a single microwave transmission element irradiates the interior volume of the reaction chamber.

Example 21

The apparatus of any one of Examples 1 through 19 wherein multiple microwave transmission elements irradiate the interior volume of the reaction chamber.

Example 22

The apparatus of Example 21 wherein the reaction chamber is elongated along an axis, and corresponding entry points of at least a subset of the multiple microwave transmission elements into the reaction chamber are arranged circumferentially about the axis.

Example 23

The apparatus of any one of Examples 21 or 22 wherein the reaction chamber is elongated along an axis, and entry points of at least a subset of the multiple microwave transmission elements are arranged lengthwise along the reaction chamber.

Example 24

The apparatus of any one of Examples 21 through 23 wherein the reaction chamber is elongated along an axis, and entry points of at least a subset of the multiple microwave transmission elements are arranged in a spiral along and around the reaction chamber.

Example 25

The apparatus of any one of Examples 21 through 24 wherein the reaction chamber is elongated along an axis, and entry points of at least a subset of the multiple microwave transmission elements are arranged so that the microwave radiation of part (b) propagates longitudinally through the reaction chamber.

Example 26

The apparatus of any one of Examples 21 through 25 wherein the one or more microwave sources and the multiple microwave transmission elements are arranged so that the microwave radiation that propagates along each one of the multiple microwave transmission elements includes the same one or more microwave frequencies as that propagating along each one of the other multiple microwave transmission elements.

Example 27

The apparatus of Example 26 wherein a corresponding relative phase of the microwave radiation propagating along at least one microwave transmission element differs from that of at least one other of the microwave transmission elements.

Example 28

The apparatus of any one of Examples 21 through 25 wherein the one or more microwave sources and the multiple microwave transmission elements are arranged so that the microwave radiation that propagates along at least one of the multiple microwave transmission elements includes at least one microwave frequency different from that propagating along at least one of the other microwave transmission elements.

Example 29

The apparatus of any one of Examples 21 through 28 wherein the one or more microwave sources and the multiple microwave transmission elements are arranged so that at least one of the microwave transmission elements irradiates the interior volume of the reaction chamber with microwave radiation at two or more of the simultaneous multiple different microwave frequencies.

Example 30

The apparatus of any one of Examples 21 through 29 wherein the one or more microwave sources and the multiple microwave transmission elements are arranged so that the microwave radiation that propagates along at least one of the multiple microwave transmission elements has a power level that differs from that of at least one other of the microwave transmission elements.

Example 31

The apparatus of any one of Examples 1 through 30 further comprising one or more reactant materials contained within the reaction chamber, wherein the one or more reactant materials react in the reaction chamber according to a microwave-assisted chemical reaction catalyzed by the one or more catalytic materials upon irradiation by the microwave radiation.

Example 32

The apparatus of Example 31 further comprising one or more reactant inlets arranged so as to enable flow of the one or more reactant materials into the reaction chamber.

Example 33

The apparatus of any one of Examples 31 or 32 wherein the one or more reactant materials include one or more of carbon dioxide, carbon monoxide, one or more alkanes, one or more alkenes, one or more alkynes, one or more alcohols, coal, coke, biomass or biochar, water or steam, hydrogen, oxygen, nitrogen, one or more nitrogen oxides, or one or more sulfur oxides.

Example 34

The apparatus of any one of Examples 1 through 33 further comprising one or more product materials contained within the reaction chamber, wherein the one or more product materials are produced in the reaction chamber by a microwave-assisted chemical reaction catalyzed by the one or more catalytic materials upon irradiation by the microwave radiation.

Example 35

The apparatus of Example 34 further comprising one or more product outlets arranged so as to enable flow of the one or more product materials out of the reaction chamber.

Example 36

The apparatus of any one of Examples 34 or 35 wherein the one or more product materials include one or more of carbon dioxide, carbon monoxide, water or steam, hydrogen, synthesis gas, nitrogen, ammonia, sulfur, one or more alkanes, one or more alkenes, one or more alkynes, or one or more alcohols.

Example 37

The apparatus of any one of Examples 1 through 36 wherein the one or more catalytic materials include one or more of magnetite, iron, nickel, copper, cobalt, aluminum, zeolite, rhodium, palladium, platinum, metal(s), metal oxide (s), or metal compound(s).

Example 38

The apparatus of any one of Examples 1 through 37 wherein the one or more catalytic materials are arranged in the reaction chamber as a packed bed, a fluidized bed, or one or more monoliths.

Example 39

A method for using the apparatus of any one of Examples 1 through 38, the method comprising: (a) emitting from the one or more microwave sources the microwave radiation at the multiple different microwave frequencies simultaneously or at the one or more time-varying microwave frequencies; and (b) irradiating at least portions of the interior volume of the reaction chamber with the microwave radiation of part (a) that propagates along the one or more microwave transmission elements into the reaction chamber.

Example 40

The method of Example 39 further comprising introducing one or more reactant materials into the reaction chamber.

Example 41

The method of any one of Examples 39 or 40 further comprising extracting one or more product materials from the reaction chamber.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An apparatus comprising:
   (a) a reaction chamber containing one or more catalytic materials;
   (b) one or more microwave sources arranged collectively so as to emit microwave radiation at one or more time-varying microwave frequencies; and
   (c) one or more microwave transmission elements arranged so as to irradiate at least portions of an interior volume of the reaction chamber with the microwave radiation of part (b) that propagates along the one or more microwave transmission elements into the reaction chamber,
   wherein:
   (d) the reaction chamber is characterized by a maximum temperature variation of a fixed-frequency, steady-state temperature spatial profile that results from irradiation, along the one or more microwave transmission elements, of the interior volume by microwave radiation at a single substantially fixed microwave frequency and at a reference microwave power level;
   (e) upon irradiation of the interior volume at the reference power level, by the microwave radiation of part (b) that propagates along the one or more microwave transmission elements of part (c), the one or more time-varying microwave frequencies result in a multi-frequency temperature spatial profile having a maximum temperature variation less than the maximum temperature variation of the fixed-frequency, steady-state temperature spatial profile;
   (f) each time-varying microwave frequency undergoes a corresponding periodic variation across a corresponding microwave tuning range, with each corresponding periodic variation being characterized by a corresponding frequency-variation period; and
   (g) the reaction chamber is characterized by a time constant for reaching the fixed-frequency, steady-state temperature spatial profile in the interior volume upon irradiation, along the one or more microwave transmission elements, of the interior volume by microwave radiation at a substantially fixed microwave frequency, and each corresponding frequency-variation period is less than or about equal to the time constant.

2. The apparatus of claim 1 wherein the one or more microwave transmission elements includes (i) one or more coaxial cables connected to one or more corresponding microwave antennae, or (ii) one or more microwave waveguides.

3. The apparatus of claim 1 wherein each corresponding frequency-variation period is between about 10 milliseconds and about 10 seconds.

4. The apparatus of claim 1 wherein each corresponding frequency-variation period is sufficiently short so that the multi-frequency temperature spatial profile achieves a substantially steady state during irradiation of the interior volume by the microwave radiation of part (b) that propagates along the one or more microwave transmission elements of part (c).

5. The apparatus of claim 1 wherein at least one corresponding frequency-variation period is sufficiently long so that the multi-frequency temperature spatial profile varies with time during irradiation of the interior volume by the microwave radiation of part (b) that propagates along the one or more microwave transmission elements of part (c).

6. The apparatus of claim 1 wherein each corresponding microwave tuning range extends from about 900 MHz to about 1000 MHz, from about 2000 MHz to about 2500 MHz, or from about 5500 MHz to about 7500 MHz.

7. The apparatus of claim 1 wherein (i) the microwave radiation of part (b) includes two or more time-varying microwave frequencies.

8. The apparatus of claim 7 wherein at least one corresponding microwave tuning range differs from at least one other corresponding microwave tuning range.

9. The apparatus of claim 7 wherein the two or more time-varying microwave frequencies all vary across a single microwave tuning range.

10. The apparatus of claim 1 wherein the microwave radiation of part (b) includes only one time-varying microwave frequency characterized by only a single frequency-variation period and a single microwave tuning range.

11. The apparatus of claim 1 wherein only a single microwave transmission element irradiates the interior volume of the reaction chamber.

12. The apparatus of claim 1 wherein multiple microwave transmission elements irradiate the interior volume of the reaction chamber.

13. The apparatus of claim 12 wherein the reaction chamber is elongated along an axis, and corresponding entry points of at least a subset of the multiple microwave transmission elements into the reaction chamber are arranged circumferentially about the axis, lengthwise along the reaction chamber, in a spiral along and around the reaction chamber, or so that the microwave radiation of part (b) propagates longitudinally through the reaction chamber.

14. The apparatus of claim 12 wherein the one or more microwave sources and the multiple microwave transmission elements are arranged so that microwave radiation that propagates along each one of the multiple microwave transmission elements includes the same one or more microwave frequencies as that propagating along each one of the other multiple microwave transmission elements.

15. The apparatus of claim 12 wherein the one or more microwave sources and the multiple microwave transmission elements are arranged so that microwave radiation that propagates along at least one of the multiple microwave transmission elements includes at least one microwave frequency different from that propagating along at least one of the other microwave transmission elements.

16. The apparatus of claim 8 wherein the one or more microwave sources and the one or more microwave transmission elements are arranged so that at least one of the one or more microwave transmission elements irradiates the interior volume of the reaction chamber with microwave radiation at two or more of the time-varying microwave frequencies.

17. The apparatus of claim 1 further comprising one or more reactant materials contained within the reaction chamber, wherein the one or more reactant materials react in the reaction chamber according to a microwave-assisted chemical reaction catalyzed by the one or more catalytic materials upon irradiation by the microwave radiation.

18. The apparatus of claim 1 further comprising one or more product materials contained within the reaction chamber, wherein the one or more product materials are produced in the reaction chamber by a microwave-assisted chemical reaction catalyzed by the one or more catalytic materials upon irradiation by the microwave radiation.

19. The apparatus of claim 1 wherein the one or more catalytic materials include one or more of magnetite, iron, nickel, copper, cobalt, aluminum, zeolite, rhodium, palladium, platinum, metal(s), metal oxide(s), or metal compound(s).

20. The apparatus of claim 1 wherein the one or more catalytic materials are arranged in the reaction chamber as a packed bed, a fluidized bed, or one or more monoliths.

21. The apparatus of claim 1 wherein each corresponding frequency-variation period is less than about one half of the time constant.

22. The apparatus of claim 1 wherein each corresponding frequency-variation period is less than about one third of the time constant.

23. The apparatus of claim 1 wherein each corresponding frequency-variation period is less than about one fifth of the time constant.

24. A method for using the apparatus of claim 1, the method comprising:
(a) emitting from the one or more microwave sources the microwave radiation at the one or more time-varying microwave frequencies; and
(b) irradiating at least portions of the interior volume of the reaction chamber with the microwave radiation of part (a) that propagates along the one or more microwave transmission elements into the reaction chamber.

25. The method of claim 24 further comprising introducing one or more reactant materials into the reaction chamber.

26. The method of claim 24 further comprising extracting one or more product materials from the reaction chamber.

* * * * *

UNITED STATES PATENT AND TRADEMARK OFFICE
CERTIFICATE OF CORRECTION

PATENT NO. : 10,343,134 B2
APPLICATION NO. : 15/292100
DATED : July 9, 2019
INVENTOR(S) : King It is certified that error appears in the above-identified patent and that said Letters Patent is hereby corrected as shown below:

In the Claims

At Column 17 Line 48 (first line of Claim 16): replace "claim 8" with --claim 7--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*